US006429865B1

(12) United States Patent
Marshall

(10) Patent No.: US 6,429,865 B1
(45) Date of Patent: Aug. 6, 2002

(54) TRIANGLE STRIP LENGTH MAXIMIZATION

(75) Inventor: Carl S. Marshall, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/306,358

(22) Filed: May 6, 1999

(51) Int. Cl.[7] .................................. G06T 17/00
(52) U.S. Cl. ...................... 345/420; 345/423
(58) Field of Search .................. 345/419, 420, 345/423, 679, 619; 382/154

(56) References Cited

U.S. PATENT DOCUMENTS

| | | | | |
|---|---|---|---|---|
| 5,448,687 A | * | 9/1995 | Hoogerhyde et al. | 345/423 |
| 5,862,252 A | * | 1/1999 | Yamamoto et al. | 382/154 |
| 5,945,996 A | * | 8/1999 | Migdal et al. | 345/420 |
| 6,137,492 A | * | 10/2000 | Hoppe | 345/420 |
| 6,208,347 B1 | | 3/2001 | Migdal et al. | 345/419 |

OTHER PUBLICATIONS

Arkin, E.M., et al., "Hamiltonian Triangulations for Fast Rendering", Second Annual European Symposium on Algorithms, 855, Springer–Verlag Lecture Notes in Computer Science, pp. 1–17, (1994).

Evans, F., et al., "Efficiently Generating Triangle Strips for Fast Rendering", SIGGRAPH Presentation, pp. 1–25, (Dec. 1996).

Evans, F., et al., "Optimizing Triangle Strips for Fast Rendering", IEEE Visualization Presentation Seminar, San Francisco, CA, 8 p., (Oct. 27–Nov. 1, 19).

* cited by examiner

Primary Examiner—Mark Zimmerman
Assistant Examiner—Huedung X. Cao
(74) Attorney, Agent, or Firm—Schwegman, Lundberg, Woessner & Kluth, P.A.

(57) ABSTRACT

Triangle strip length maximization. Embodiments of the invention provide an efficient mechanism to represent triangle meshes as series of one or more triangle strips. In one embodiment, a computer-implemented method first including determining an area of each of a plurality of triangles of a triangle mesh. A distance from the smallest area triangle to every other triangle on the list is determined. An available triangle on the list closest to the smallest area triangle is added to a triangle strip that beings with the smallest area triangle.

21 Claims, 7 Drawing Sheets

TRIANGLE STRIP LENGTH MAXIMIZATION

FIELD OF THE INVENTION

This invention relates generally to three-dimensional (3D) models represented as triangle meshes, and more particularly to representing a triangle mesh as a series of triangle strips.

BACKGROUND OF THE INVENTION

As computers become increasingly more powerful, they have been increasingly used to run computer programs that utilize three-dimensional (3D) models, or objects. Such programs include game programs where a game player views his or her surroundings in three dimensions, computer-aided-drafting (CAD) programs allowing architects, engineers and designers to construct plans for real-world objects in three dimensions, as well as other programs. The three-dimensional objects used by these and other computer programs have generally become increasingly complex.

One manner by which three-dimensional models are represented within a computer is known as a triangle mesh. A triangle mesh includes a number of differently sized triangles, such that at least one edge of each triangle within the mesh is shared with another triangle, and each vertex of each triangle within the mesh is shared with at least one other triangle. Complex three-dimensional objects can be constructed utilizing triangle meshes. For example, small numbers of triangles can be used for flat surfaces of an object, while large numbers can be used to mold curved surfaces of the object, similar to the way a geodesic dome is constructed.

As triangle meshes have gained popularity to represent three-dimensional models within computers, and as these triangle meshes have become more complex to represent increasingly complex three-dimensional models, the issue of representing a triangle mesh in a sequential manner has become important. A triangle mesh is generally a non-sequential representation: it usually does not have a set beginning nor a set end. Representing the triangle mesh sequentially, however, is important to save the triangle mesh to a sequential file for storage on a storage device such as a hard disk drive, for instance, or for sending to another computer over a network such as the Internet, for example. Furthermore, it is also important in sending triangles to a graphics card via a graphics application programming interface (API).

One manner by which triangle meshes are represented in a sequential manner is through the use of triangle strips. A triangle strip defines a connected group of triangles in a sequential fashion, having a set beginning and a set end. In one representation of a triangle strip, the strip is represented as a series of vertices. A new triangle is typically defined for each vertex presented after the first two vertices. In this particular representation, N=2 triangles are defined, where N is the number of vertices in the representation.

Once triangle strips are selected as a desired manner by which to represent triangle meshes in a sequential manner, an important issue becomes the manner in which a triangle mesh is converted to a series of one or more triangle strips. The series of triangle strips must as a whole represent all of the plurality of triangles within the mesh. For a compact representation, desirably no triangles within the mesh are repeated within the triangle strips—that is, each single triangle within the mesh is represented only once within the triangle strips. Furthermore, longer triangle strips are generally better, because they usually lend themselves to easier storage and transmission as a file. For these and other reasons, there is a need for the present invention.

SUMMARY OF THE INVENTION

Embodiments of the present invention relate to triangle strip length maximization. In one embodiment, a computer-implemented method first includes determining an area of each of a plurality of triangles of a triangle mesh. A list of the plurality of triangles is generated. A distance from the smallest area triangle to every other triangle on the list is determined. An available triangle on the list closest to the smallest area triangle is added to a triangle strip that begins with the smallest area triangle. The process of creating triangle strips continues until all of the triangles are represented in the strips.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1A:
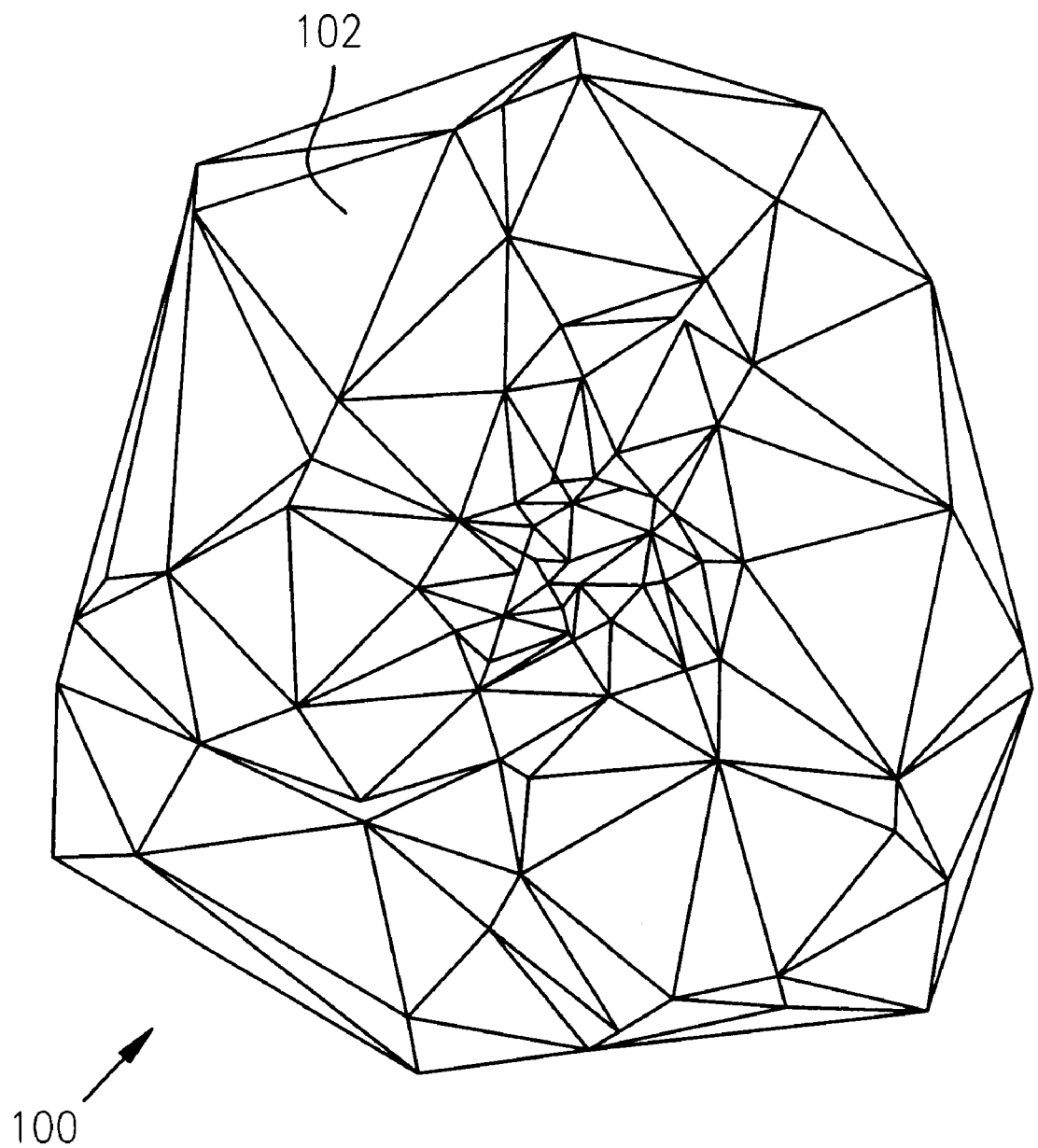
FIGS. 1(a)–1(c) show diagrams of representative examples of triangle meshes that can be utilized in conjunction with embodiments of the invention.
Figure 1B:
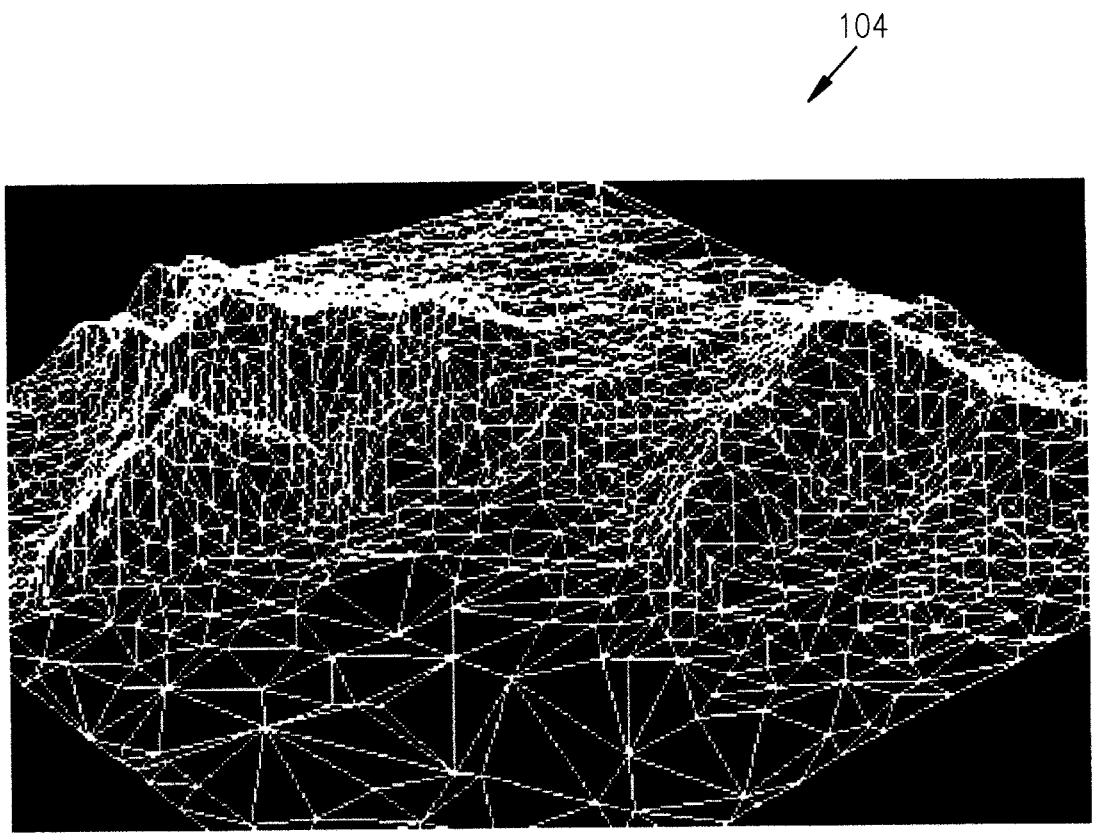
Figure 1C:
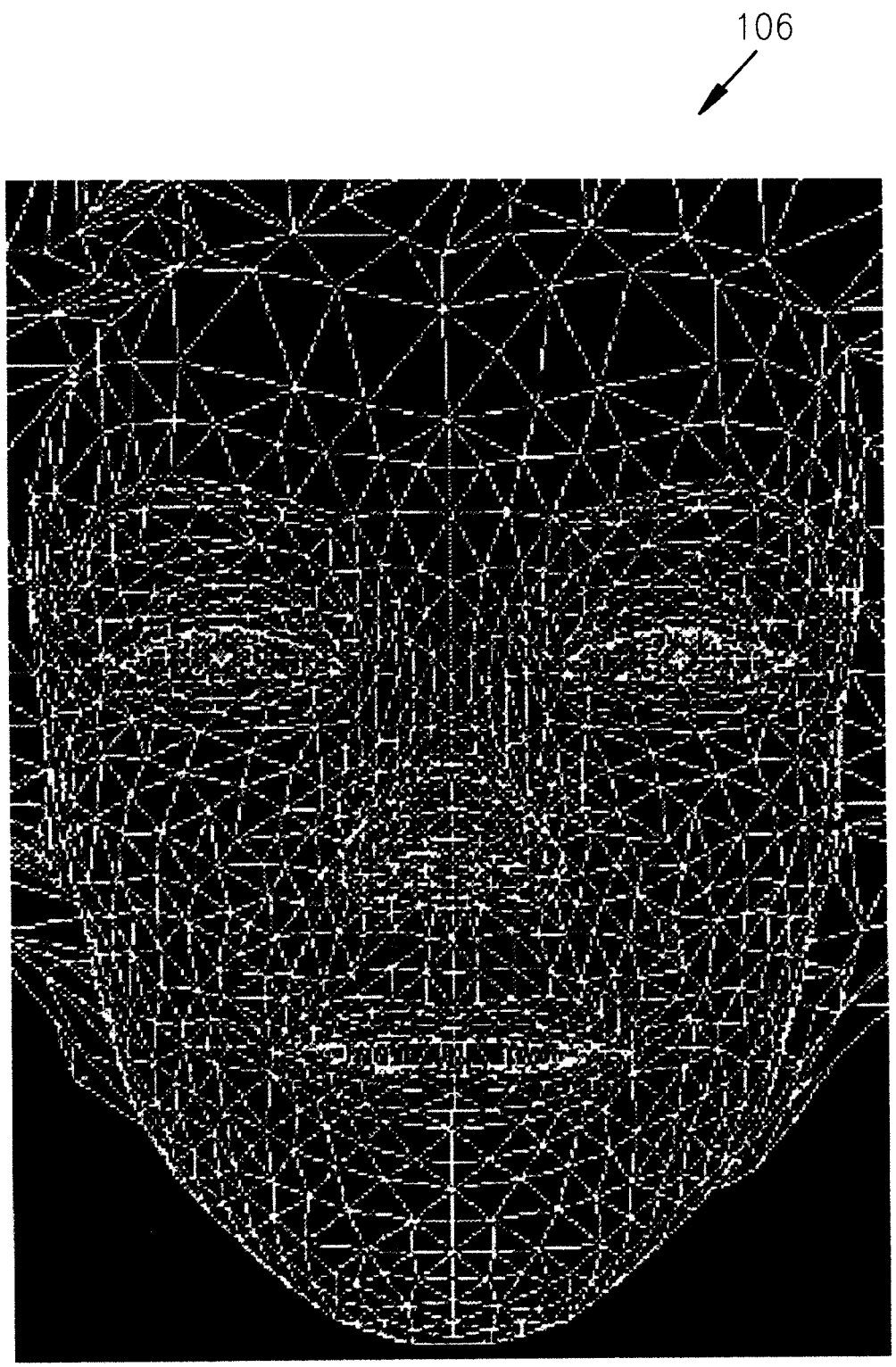

At least some embodiments of the invention can be used to represent a triangle mesh as a series of triangle strips. A representative example of a triangle mesh is shown in FIG. 1(a), which includes a triangle mesh 100 having a plurality of triangles, such as the triangle 102. The triangle mesh 100 itself represents a three-dimensional object. Those of ordinary skill within the art can appreciate that the invention is not limited to a given complexity of a triangle mesh that can be represented as a series of triangle strips. Other representative examples of triangle meshes include a triangle mesh 104 of FIG. 1(b), which represents a three-dimensional terrain, and a triangle mesh 106 of FIG. 1(c), which represents a three-dimensional representation of a human face.

Figure 2:
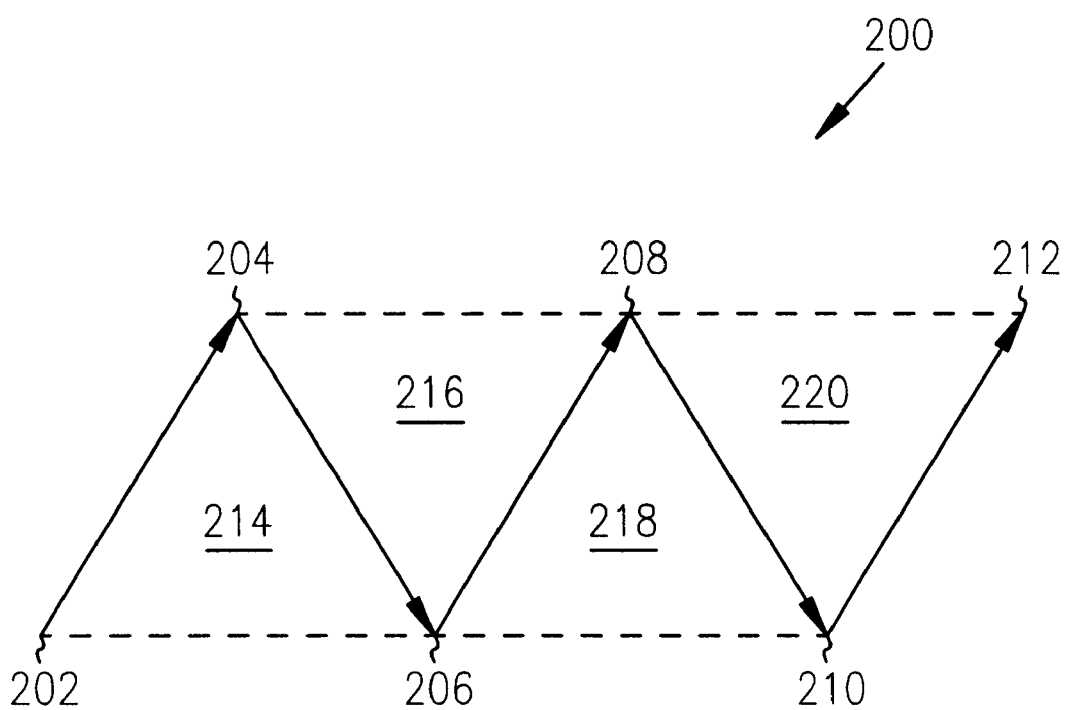
FIG. 2 shows a diagram of a representative example of a triangle strip that can be generated in conjunction with embodiments of the invention.

A representative example of a triangle strip that can be generated by at least some embodiments of the invention is shown in FIG. 2. The triangle strip 200 is represented as a series of vertices 202, 204, 206, 208, 210 and 212, which define the triangles of the strip 200, triangles 214, 216, 218 and 220. Triangle 214, for example, is defined as the first three vertices 202, 204 and 206. Triangle 216 is defined as the three vertices beginning with vertex 204, vertices 204, 206 and 208. Triangle 218 is defined as the three vertices beginning with the vertex 206, vertices 206, 208 and 210. Triangle 220 is defined as the three vertices beginning with the vertex 208, vertices 208, 210 and 212. Thus, for the N=6 vertices of the triangle strip 200, N−2=4 triangles are defined.

Those of ordinary skill within the art can appreciate, however, that this relationship of N−2 triangles being defined for N vertices does not necessarily always hold. For example, in triangle strip 200 each successive triangle is defined by a beginning edge equal to the leading edge of the previous triangle: triangle 216, for instance, begins with the edge defined by vertices 204 and 206, which is the leading edge of the triangle 214. In the situation where a successive triangle is defined by a beginning edge equal to an edge of the previous triangle that is not the leading edge of the previous triangle, a vertex may have to be repeated within the representation of the triangle strip, such that the relationship of N−2 triangles being defined for N vertices does not hold.

Figure 3A:
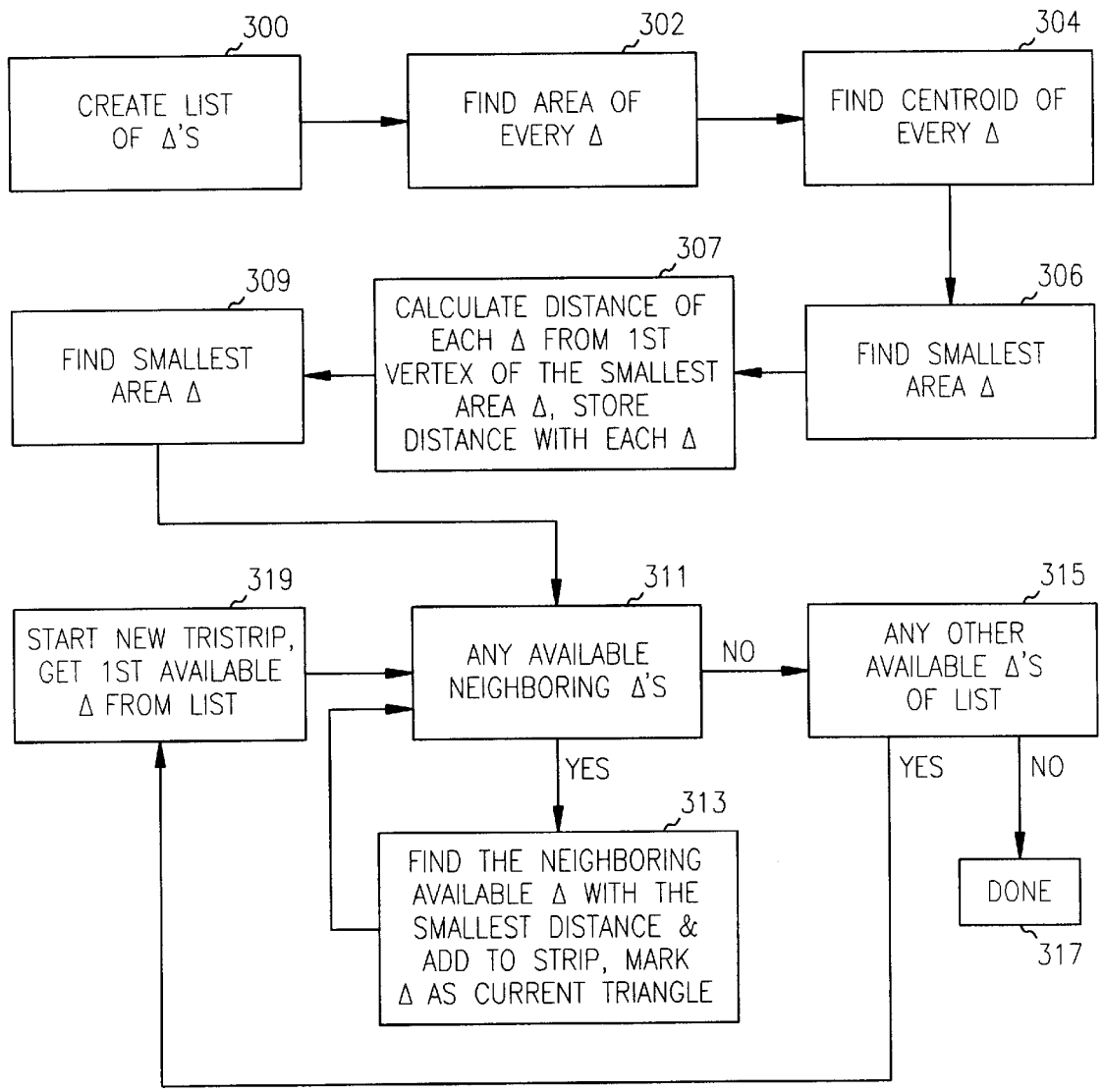
FIG. 3(a) shows a flowchart of a computer-implemented method according to an embodiment of the invention.

A computer-implemented method according to an embodiment of the invention to generate a series of at least one triangle strip from a triangle mesh is shown in FIG. 3(a). This embodiment of the invention attempts to maximize the length of the triangle strips generated to represent the triangle mesh. The computer-implemented method is desirably realized at least in part as one or more programs running on a computer—that is, as a program executed from a machine-readable medium such as a memory by a processor of a computer. The programs are desirably storable on a machine-readable medium such as a floppy disk or a CD-ROM, for distribution and installation and execution on another computer.

In block 300, a list of triangles is created. Each triangle is defined as having three vertices, such that each vertex can be represented by a triplet of coordinates (x, y, and z), specifying the vertex's location in three-dimensional (3D) space. In block 302, the area of every triangles is determined. In block 304, the centroid of every triangle is found. The centroid of a triangle is defined as the center point of the triangle, equidistant to each of the vertices of the triangle. The centroid is also represented as a triplet of coordinates (x, y, and z), specifying the centroid's location in three-dimensional space.

In block 306, the smallest area triangle is found, and in bock 307, the distance of each triangle from the first vertex of the triangle found in block 306 is calculated, and stored. In block 309, the next smallest triangle still on the list generated in block 302 is retrieved and removed from the list. Furthermore, in block 306, a new triangle strip is generated. This triangle strip begins with the vertices a, b and c of the triangle retrieved and removed.

In block 311, it is determined whether there are any neighboring triangles to the current triangle. If yes, then the neighboring available triangle with the smallest distance is added to the triangle strip in block 313, and is marked as the current triangle, and the method proceeds back to block 311. A triangle must contain some properties (i.e. same texture, material properties, smoothing groups) in common with other triangles in the triangle strip in order to be added to the triangle strip. If no, then it is determined if there are any other triangles still on the list in block 315; if not, then the method ends at block 317. Otherwise, in block 319 a next triangle is obtained from the list and the method proceeds back to block 311.

Figure 3B:
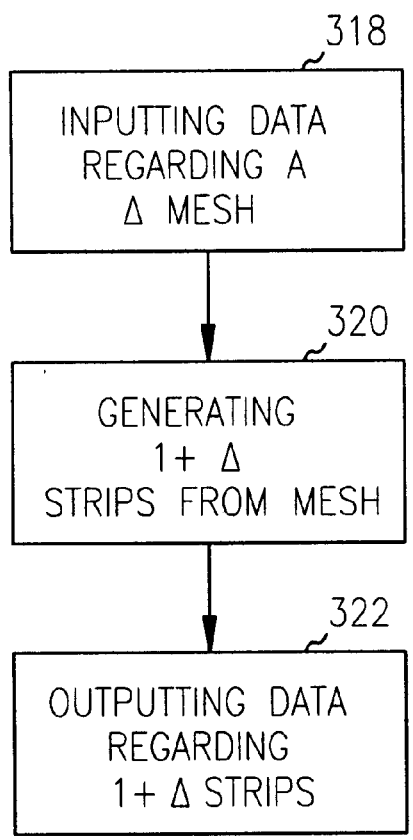
FIG. 3(b) shows a flowchart of another computer-implemented method according to an embodiment of the invention.

Referring next to FIG. 3(b), a flowchart of a method according to another embodiment of the invention is shown. Like the method of FIG. 3(a), the computer-implemented method of FIG. 3(b) is desirably realized at least in part as one or more programs running on a computer—that is, as a program executed from a machine-readable medium such as a memory by a processor of a computer. The programs are desirably storable on a machine-readable medium such as a floppy disk or a CD-ROM, for distribution and installation and execution on another computer.

In block 318, data regarding a triangle mesh is input. For example, the data can be received as entered by a user from an input device (such as a keyboard, etc.); the data can be received as read from a storage device (such as a hard disk drive or a removable media device); the data can be received through a network (such as over the Internet); etc. The invention is not so limited.

In block 320, a series of one or more triangle strips representing the triangle mesh is generated. In one embodiment of the invention, the strips are generated as has been described in conjunction with FIG. 3(a). However, the invention is not necessarily so limited.

Finally, in block 322, data regarding the triangle strip is output. For example, the data can be displayed on a display device, such as a cathode ray tube (CRT) monitor or a flat panel display (FPD); the data can be saved to a storage device (such as a hard disk drive or a removable media device); the data can be sent through a network (such as over the Internet); etc. The invention is not so limited.

Figure 4:
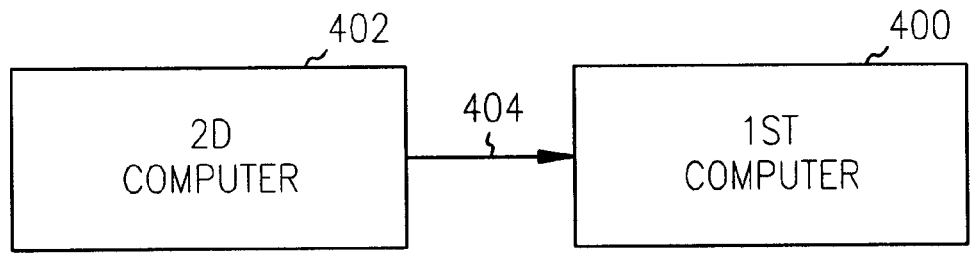
FIG. 4 shows a diagram of a computerized system according to an embodiment of the invention; and, FIG. 5 shows a diagram of a computer in conjunction with which embodiments of the invention may be practiced.

Referring next to FIG. 4, a diagram of a system in accordance with an embodiment of the invention is shown.

The system of FIG. 4 can, for example, provide the manner by which the methods of FIGS. 3(a) and 3(b) are implemented. However, the invention is not so limited. The system of FIG. 4 includes two components: a first computer 400 and a second computer 402. The first computer 400 renders a three-dimensional model represented by at least one triangle strip (i.e., a series of one or more triangle strips)—that is, such that the model can be displayed on a display device, or otherwise output. The second computer generates the series of one or more triangle strips, from a plurality of triangles of a triangle mesh. In one embodiment, the second computer generates the triangle steps as has been described in conjunction with FIG. 3(a); however, the invention is not necessarily so limited.

The arrow 404 of FIG. 4 represents the manner by which the triangle strips generated by the second computer 402 are output therefrom and input to the first computer 400 for rendering. For example, the second computer can save data representing the triangle strips to a removable storage media, such that the first computer loads the data therefrom; the second computer can send data representing the triangle strips over a network and the first computer can receive the data therefrom; etc. The invention is not so limited.

In one embodiment of the invention, the second computer includes a plug-in computer program, as known in the art, to generate the at least one triangle strip. For example, the second computer may be running a graphics program that provides for the capability of adding plug-in computer programs. Such a plug-in computer program can thus be the mechanism by which a triangle mesh—generated by the graphics program—is converted to be represented by a series of one or more triangle strips. The invention is not so particularly limited, however.

Similarly, in one embodiment of the invention, the first computer includes a plug-in computer program, as known in the art, to render the at least one triangle strip. For example, the first computer may be running a web browser program for navigating the Internet, that provides for the capability of adding plug-in computer programs. Such a plug-in computer program can thus be the mechanism by which a series of triangle strips—downloaded from the Internet by the web browser program—is rendered for display or other output on the first computer. The invention is not so particularly limited, however.

Figure 5:
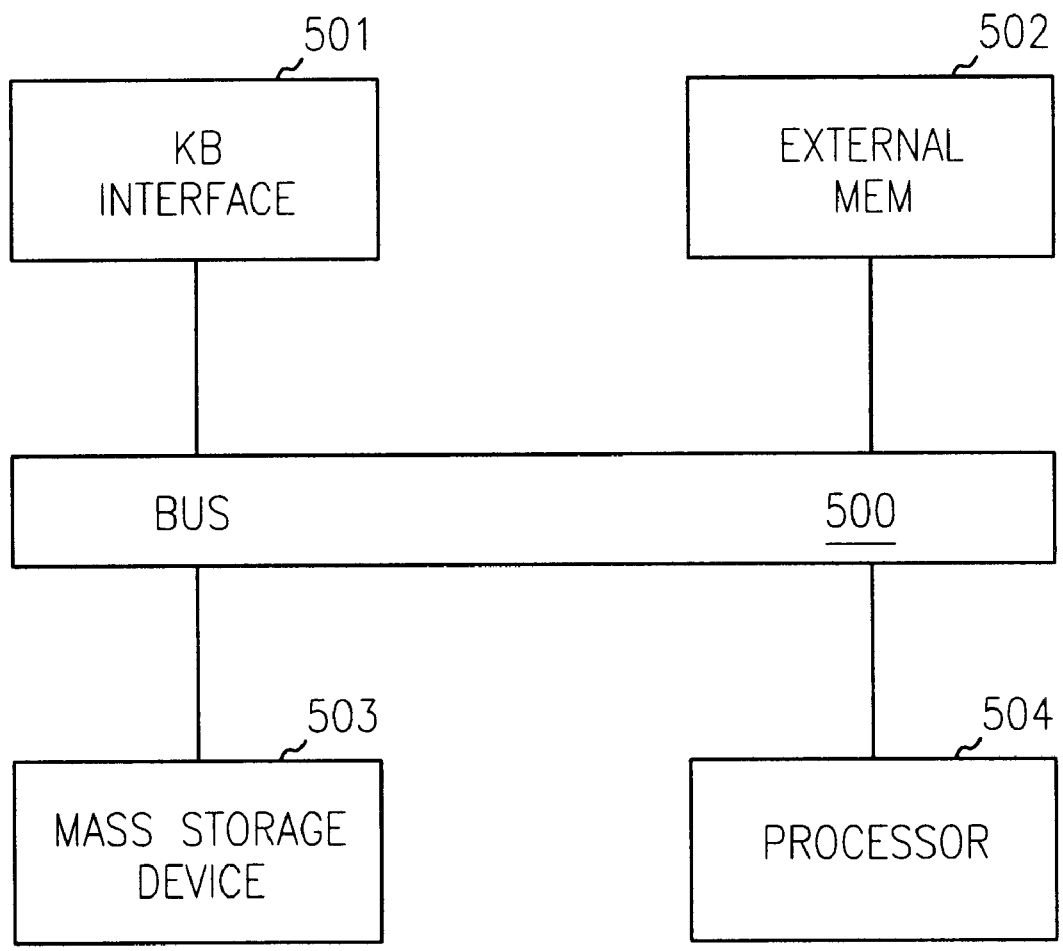

Referring finally to FIG. 5, a diagram of a computer in conjunction with which embodiments of the invention may be practiced is shown. For example, the computer of FIG. 5 can act as the first or the second computer as has been described in conjunction with FIG. 4. The computer comprises bus 500, keyboard interface 501, external memory 502, mass storage device 503 and processor 504. Bus 500 can be a single bus or a combination of multiple buses. Bus 500 can also comprise combinations of any buses. Bus 500 provides communication links between components in the computer. Keyboard controller 501 can be a dedicated device or can reside in another device such as a bus controller or other controller. Keyboard controller 501 allows coupling of a keyboard to the computer system and transmits signals from a keyboard to the computer system. External memory 502 can comprise a dynamic random access memory (DRAM) device, a static random access memory (SRAM) device, or other memory devices. External memory 502 stores information from mass storage device 503 and processor 504 for use by processor 504. Mass storage device 503 can be a hard disk drive, a floppy disk drive, a CD-ROM device, or a flash memory device. Mass storage device 504 provides information to external memory 502. Processor 504 can be a microprocessor and is capable of decoding and executing a computer program such as an application program or operating system with instructions from multiple instruction sets.

Triangle strip length maximization has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
   determining an area of each of a plurality of triangles of a triangle mesh;
   generating a list of the plurality of triangles;
   finding the triangle having the smallest area; determining a distance from the triangle having the smallest area to every other triangle on the list; and,
   adding an available triangle on the list closest to the triangle having the smallest area to a triangle strip beginning with the triangle having the smallest area.

2. The computer-implemented method of claim 1, wherein adding an available triangle on the list comprises adding a triangle on the list that shares an edge with the triangle having the smallest area.

3. The computer-implemented method of claim 2, wherein adding a triangle on the list that shares an edge with the triangle having the smallest area comprises adding a triangle on the list that also has identical properties to the triangle having the smallest area.

4. The computer-implemented method of claim 2, wherein adding an available triangle on the list further comprises removing the available triangle from the list.

5. The computer-implemented method of claim 1, further comprising adding an available triangle on the list next closest to the triangle having the smallest area to the triangle strip.

6. The computer-implemented method of claim 5, wherein adding an available triangle on the list next closest to the triangle having the smallest area comprises:
   adding a triangle on the list that shares an edge with a triangle most recently added to the list; and,
   removing the available triangle from the list.

7. The computer-implemented method of claim 6, wherein adding a triangle on the list that shares an edge with a triangle most recently added to the list comprises adding a triangle on the list that also has identical properties to the triangle most recently added to the list.

8. The computer-implemented method of claim 5, further comprising repeating adding an available triangle on the list next closest to the triangle having the smallest area to the triangle strip until no more available triangles are on the list.

9. The computer-implemented method of claim 8, wherein repeating adding an available on the list next closest to the triangle having the smallest area to the triangle strip until no more available triangles are on the list comprises:
   adding a triangle on the list that shares an edge with a triangle most recently added to the list and has identical properties to the triangle most recently added to the list; and,
   removing the available triangle from the list.

10. The computer-implemented method of claim 8, further comprising:

finding a second triangle on the list;

adding an available triangle still on the list based on a pre-stored distance per triangle from an initial vertex to a second triangle strip beginning with the second triangle;

repeating adding an available triangle still on the list next closest with a smallest distance to the second triangle strip until no more available triangles are on the list.

11. The computer-implemented method of claim 10, further comprising generating additional triangle strips, each beginning with a next available triangle on the list, until no more triangles are on the list.

12. The computer-implemented method of claim 1, further comprising:

inputting data regarding the plurality of triangles of the triangle mesh; and, outputting data regarding the triangle strip.

13. The computer-implemented method of claim 12, wherein inputting data is selected from the group essentially consisting of:

receiving the data as entered by a user from an input device;

receiving the data as read from a storage device; and, receiving the data through a network.

14. The computer-implemented method of claim 12, wherein outputting data is selected from the group essentially consisting of:

displaying the data on a display device;

saving the data to a storage device; and, sending the data through a network.

15. A computerized system comprising:

a first computer to render at least one triangle strip; and, a second computer to generate the at least one triangle strip from a plurality of triangles from a triangle mesh according to a method comprising:

determining an area of each of the plurality of triangles of the triangle mesh;

generating a list of the plurality of triangles;

finding the triangle having the smallest area;

determining a distance from the triangle having the smallest area to every other triangle on the list;

adding an available triangle on the list closest to the triangle having the smallest distance to the triangle strip beginning with the triangle having the smallest area;

repeating adding an available triangle on the list next closest to the triangle having the smallest area to the triangle strip until no more available triangles are on the list; and, generating additional triangle strips, each beginning with a next available triangle on the list, until no more triangles are on the list.

16. The computerized system of claim 15, wherein the second computer further is to save data representing the at least one triangle strip to a removable storage and the first computer further is to load the data from the removable storage.

17. The computerized system of claim 15, wherein the second computer further is to send data representing the at least one triangle strip over a network and the first computer further is to receive the data over the network.

18. The computerized system of claim 15, wherein the second computer comprises a plug-in computer program to generate the at least one triangle strip.

19. The computerized system of claim 15, wherein the first computer comprises a plug-in computer program to render the at least one triangle strip.

20. A machine-readable medium having instructions stored thereon for execution by a processor to perform a method comprising:

determining an area of each of a plurality of triangles of a triangle mesh;

generating a list of the plurality of triangles;

finding the triangle having the smallest area;

determining a distance from the triangle having the smallest area to every other triangle on the list;

adding an available triangle on the list based on a pre-stored distance per triangle from an initial vertex to a triangle strip beginning with the triangle having the smallest area; and, adding an available triangle on the list next closest to the triangle having the smallest area to the triangle strip until no more available triangles are on the list.

21. The machine-readable medium of claim 20, further comprising generating additional triangle strips, each beginning with a next available triangle on the list, until no more triangles are on the list.

* * * * *

UNITED STATES PATENT AND TRADEMARK OFFICE
CERTIFICATE OF CORRECTION

PATENT NO. : 6,429,865 B1
DATED : August 6, 2002
INVENTOR(S) : Carl S. Marshall

It is certified that error appears in the above-identified patent and that said Letters Patent is hereby corrected as shown below:

Column 1,
Line 57, delete "N=2" and insert -- N-2 --, therefor.

Signed and Sealed this

Fourth Day of February, 2003

JAMES E. ROGAN
*Director of the United States Patent and Trademark Office*